Oct. 22, 1968     R. R. WALTON     3,406,966
MACHINES FOR STACKING FLEXIBLE SHEETS
Filed Aug. 1, 1966     3 Sheets-Sheet 1
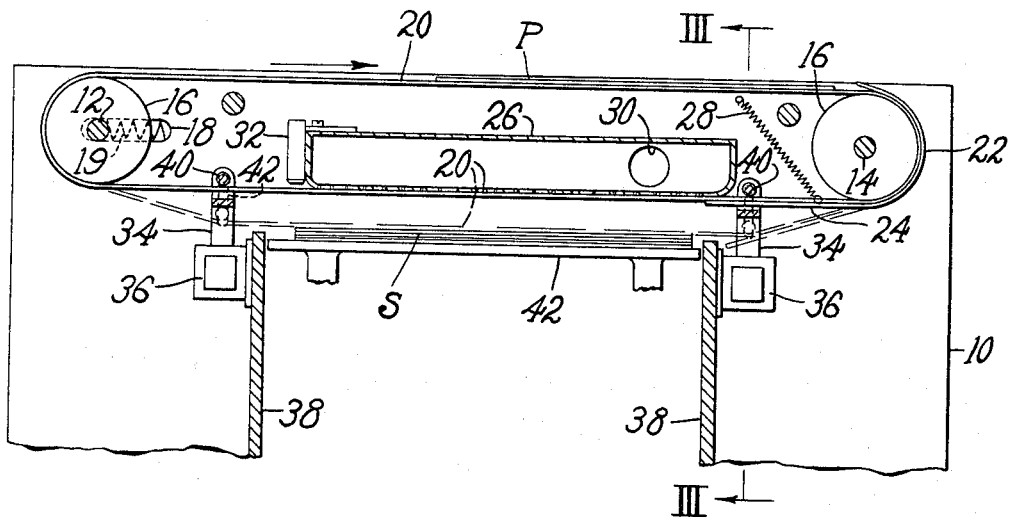
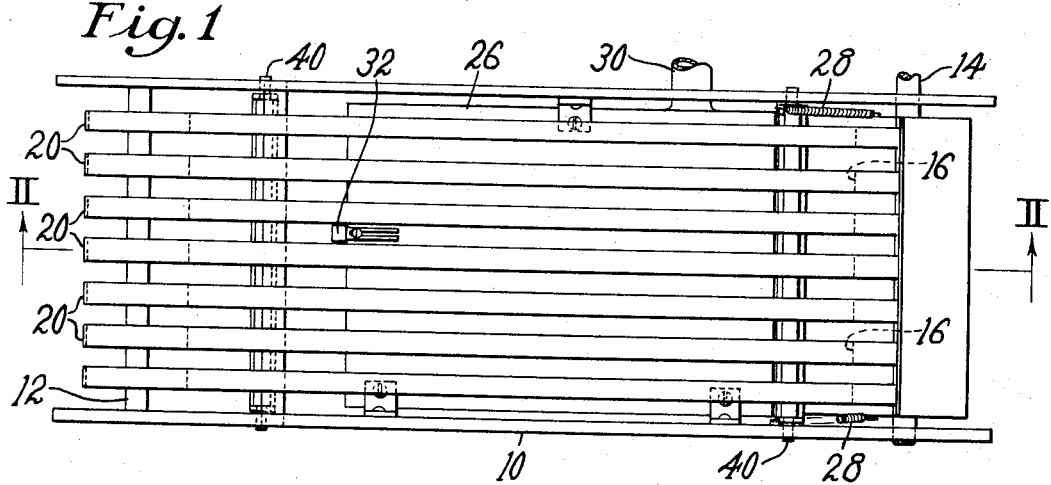
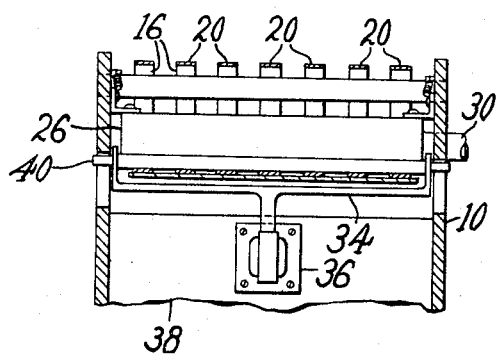
Inventor
Richard R. Walton
By his Attorney

United States Patent Office 3,406,966
Patented Oct. 22, 1968

3,406,966
MACHINES FOR STACKING FLEXIBLE SHEETS
Richard R. Walton, Boston, Mass., assignor to United Shoe Machinery Corporation, Flemington, N.J., and Boston, Mass., a corporation of New Jersey
Filed Aug. 1, 1966, Ser. No. 569,459
9 Claims. (Cl. 271—68)

ABSTRACT OF THE DISCLOSURE

A machine for feeding and stacking work pieces of sheet-like material on a work support having an automatic oscillatory stacking device responsive to the arrival of a work piece for removing the work piece from a feeder and depositing it on the support.

---

This invention relates to machines for moving sheet-like work pieces successively into predetermined relation to one another. More particularly the invention is concerned with providing improved automatic means for transferring individual flat flexible workpieces, especially of fabric, from a conveyor or other work support to a uniform stack. The invention is herein disclosed in alternate embodiments having particular utility in processing fabric but it will be understood that the invention is not thus limited.

In the garment trades and elsewhere in industry a common problem is to expeditiously and economically attain advantageous positioning of fabric workpieces as they issue singly from a work station. In many instances, before suitable processing can be had at a next station, each piece must be inverted, alternate pieces inverted, or all the pieces stacked vertically etc. Dull routine "picking up and putting down" of this nature is tedious and has hitherto often required much of the time of a skilled operator attending a machine next to process the work, and thus limited the output of the machine and that of the operator.

In view of the foregoing it is a main object of this invention to provide improved sheet stacking machines, especially those adapted for automatically stacking successive pieces of fabric in predetermined relation.

Another object is to provide accurate and reliable, yet simple mechanism for automatically stacking flexible workpieces being fed by a feeding device.

Still another object is to provide simple means cooperative with a conveyor for transferring fabric pieces into a stack wherein their positions are inverted.

To these ends, and in accordance with a feature of the invention there is provided in novel alternate embodiments, in combination with a device for feeding sheet-like workpieces in a plane, a work support adjacent thereto, and automatic oscillatory stacking means cooperative with the device and responsive to arrival of a workpiece in selected position upon the feeding device for removing the workpiece therefrom and transferring it to the work support. The several arrangements herein shown and later to be described are selected only by way of illustration of those typical problems solved by the invention, the stackers described obviously being useful ahead of or following a great variety of operating stations performing, for example, sewing, bonding, trimming, perforating, folding, or ironing, etc.

The above and other features of the invention, together with various novel details of construction and combinations of parts will now be more particularly described in connection with the illustrative stacking machines in which the invention is embodied, and with reference to the accompanying drawings in which:

FIG. 1 is a plan view of a fabric inverting and stacking device cooperative with an endless conveyor;

FIG. 2 is a longitudinal section taken on the line II—II of FIG. 1 and showing portions of the stacker of FIG. 1 in detail;

FIG. 3 is a transverse section taken on the line III—III of FIG. 2;

Figure 4:
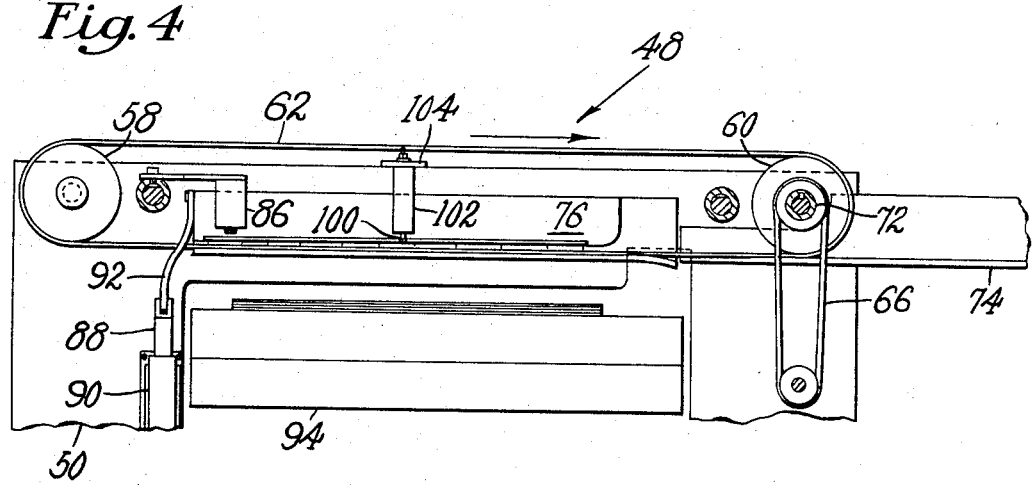
FIG. 4 is a view in side elevation of a conveyorized non-inverting stacker.

FIGS. 1–3 inclusive are shown to illustrate one embodiment of the invention, which will first be explained. It is adapted for inverting and stacking fabric workpieces that are introduced with random spacing one after another. A conveyor frame 10 has a pair of shafts 12, 14 journaled in its opposite side members to rotatably support axially spaced pulleys 16. For a purpose hereinafter explained the shaft 12 extends transversely through alined slots 18 in the opposed frame sides, respectively, and is yieldingly urged by a spring 19 (FIG. 2) in each of the slots away from the shaft 14. The latter may be continuously rotated. Endless belts 20, respectively, run over longitudinally spaced pairs of the pulleys 16. A partly semi-circular deflector or guide plate 22 extends closely about the pulleys 16 on the shaft 14 to direct each piece P from the upper conveyor reach to an inverted position beneath the lower reach. A straight inner portion 24 of the guide plate 22, which may be of lightweight sheet metal, extends beneath an end of a suction box or pan 26 and is yieldingly held horizontally by means of a pair of tension springs 28, 28 (FIGS. 1–3) upper ends of which are anchored to the sides of the frame respectively. The plate 22 is thus pivotal about the shaft 14 and suspended in light frictional relation to the belts 20 or the piece P when being fed thereon toward the underside of the pan 26. The latter is bracketed to the sides of the frame 10 and has an outlet 30 connected to a suitable source of continuous reduced air pressure.

The underside of the pan, which is normally disposed closely adjacent to the lower reach of the belts 20, is vented to enable each piece P as its progresses beyond the work supporting lower end of the portion 24 to come increasingly under the lifting influence of the suction and thus be maintained yieldingly against the belts 20. When the inverted piece P has proceeded to a point where its leading edge has traveled the length of the pan 26, the edge intercepts a light beam which may be directed angularly from a point forward of the stack S to a photocell 32 adjustably mounted on the pan 26. As a consequence a pair of solenoid operated plungers 34, 34 is actuated against the resistance of their return springs (not shown). The solenoids 36 are respectively secured to spaced uprights 38 of the frame 10. As best seen in FIG. 3 the respective plungers 34 are forked to receive opposite ends of a transversely disposed roller 40 extending above the lower reach of the belts 20. The rollers 40 are each vertically movable in slots 42 formed in the frame 10. Accordingly, the operation is such that when the piece P has arrived at its selected position along its path of travel, and while the conveyor means and the suction means both continue to function, there is a sudden and simultaneous lowering of the rollers 40, 40 to depress the lower reach of the belts 20 to the dash-line position indicated in FIG. 2. This belt displacement is effected against resistance of the springs 19 and results in rapidly separating the piece P from the pan 26 and hence wholly disrupting the lifting influence of the suction. In the interval the solenoid plungers 34 are downwardly actuated, a light beam is again directed upon the cell 32 and the solenoids 36 are deenergized to permit the springs 19 to restore the lower reach of the belts 20 to their upper work carrying positions adjacent to the pan 26.

The abrupt descent and raising of the lower belt reaches, as just explained, causes the successively positioned pieces P to be forced downwardly upon the top of a stack S that is uniformly shaped and supported on a work rest such as a table 42 which may be of the type adapted to maintain the top of the stack at a nearly constant height. The heightwise movement of the lower belt reaches also results in pivotal motion of the guide plate 22 as indicated by dash lines in FIG. 2; this is not detrimental to the uniform stacking of the pieces P and need not defer introduction thereto of the next piece P to be inverted and stacked.

Referring to FIGS. 4–8 inclusive, a non-inverting feeder and stacker resembling the machine shown in FIGS. 1–3 in some respects will next be described. An endless conveyor generally designated 48 has a pair of opposite side frames 50, 52 (FIG. 5) adjustably spaced apart by means of interconnected telescoping sleeves 54 and bars 56 thereby enabling the apparatus to be suitably adjusted for different widths of fabric workpieces P to be stacked. Journaled in each of the frames is a pair of pulleys 58, 60 for carrying endless belts 62. The belts 62 are driven on their pulleys by means of a motor 64 (FIGS. 5, 7 and 8) secured to a frame side 52, a pulley of the motor being connected by an endless belt 66 to a pulley 68 on one of a pair of telescoping drive shafts 70, 72 respectively keyed to hubs of the pulleys 60.

Figure 5:
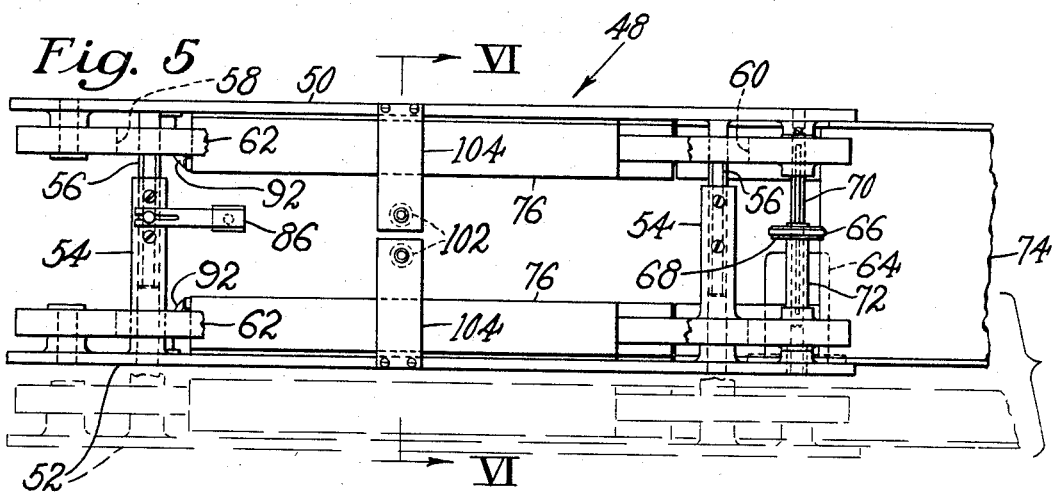
FIG. 5 is a plan view of the stacker shown in FIG. 4.

The fabric pieces P (or other sheet material) may be successively introduced to the underside of the lower reaches of the stacker belts 62 by manually advancing the pieces over the top of a table 74 and to the left as seen in FIGS. 4 and 5 and into the bight of the belt portions cooperating with the left-hand portion (as seen in FIGS. 4 and 5) of the top of the table. Successive pieces are thus moved in outstretched condition. It will be apparent that in-feed could be accomplished by any suitable means including other conveyor mechanism if desired. The opposite marginal side portions of the workpiece P to be stacked are fed over a pair of marginal supports 76, 76 cooperative with the respective belts 62. Each support 76 is preferably elongated and of smooth, lightweight sheet metal or the like bent to provide an inner shoe surface 78 on which the opposite work margins slide and with which the adjacent belt may cooperate to advance the work by traction as well as clamping to support it in substantially its own horizontal plane. The respective supports 76 are pivotally supported on the opposite sides 50, 52 by pivot pins 80. Preferably the supports, having hollow rectangular configuration in cross section thereby affording work engaging and wiping surfaces 82, 82 respectively, terminate in inwardly bent edges 84. When the workpiece P has its advance edge positioned at a predetermined point where it will intercept a light beam directed to a photocell 86 (FIGS. 4 and 5), stacking action is initiated by means next to be explained.

Figure 6:
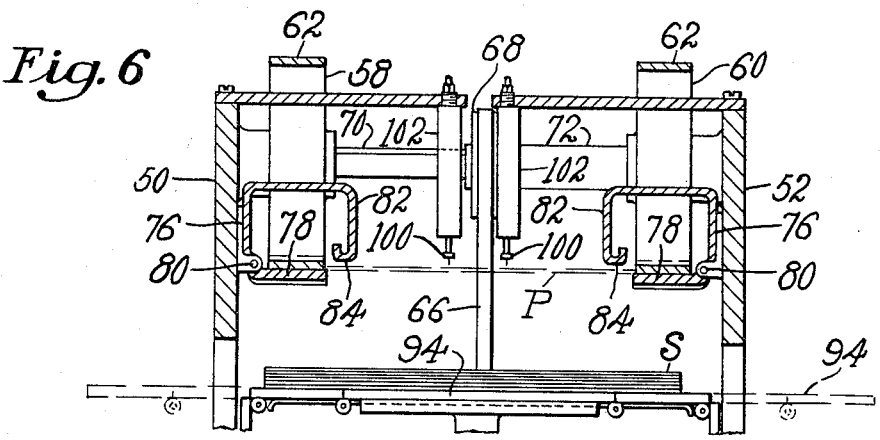
FIG. 6 is a transverse section taken on the line VI—VI of FIG. 5 and indicating work centering cylinders inoperative.
Figure 7:
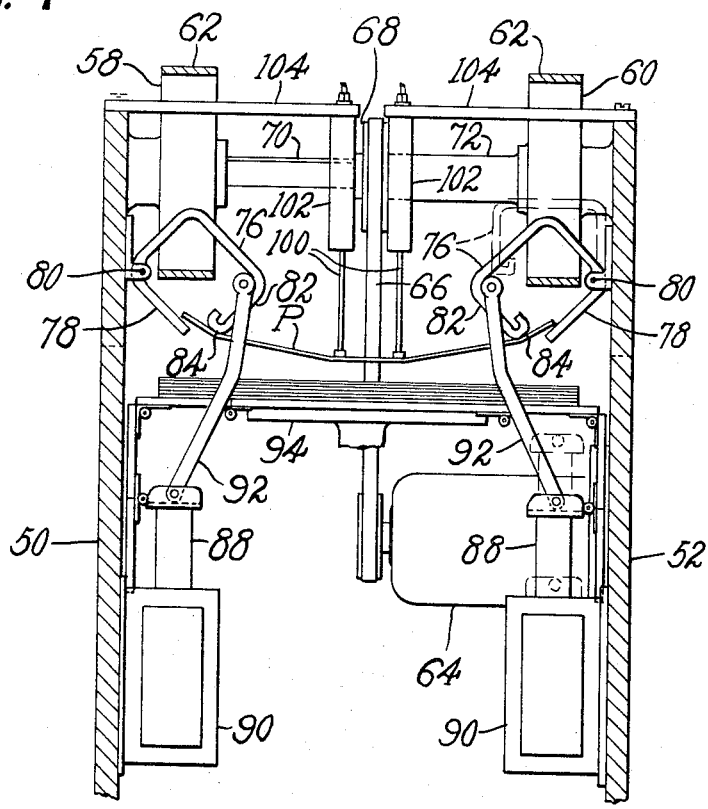
FIGS. 7 and 8 are views corresponding to FIG. 6 and showing the centering cylinders and stacking means at later stages in a cycle.
Figure 8:
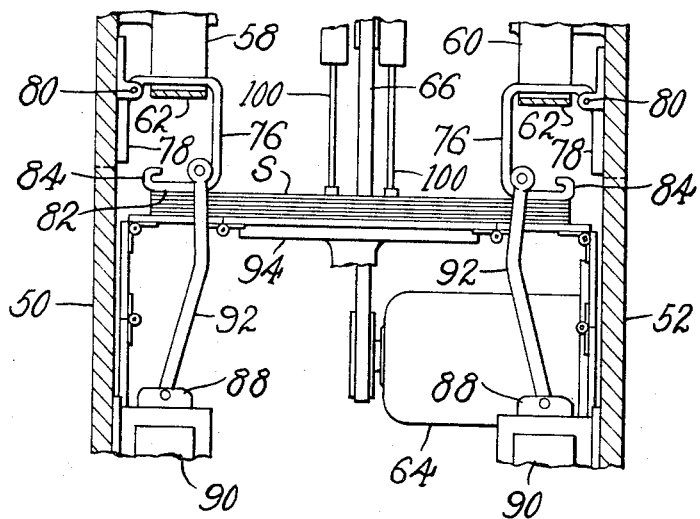

The photocell 86 simultaneously actuates a pair of spring-return solenoid plungers 88, 88 having their solenoids 90 respectively secured to the frame sides 50, 52. A link 92 pivotally interconnecting the upper end of each plunger 88 to one of the supports 76 accordingly exerts a downward pivotal force thereof to swing the shoe surfaces 78 out of the way of the piece P and against the adjacent side frame. At the same time the support edges 84, and then the wiping surfaces 82 of the supports 76 progressively contact the work margins with a downwardly and outwardly directed engagement that restrains the piece P from moving out of a uniform delivery position such as on a stack S (FIGS. 6–8). This stack may be supported on an extensible table 94 provided between the frame sides 50, 52. The table 94 is movable in the vertical direction, as previously described with regard to the table 42 of FIGS. 1 through 3, to maintain the work rest in a position such that the top of the stack is located at a substantially constant height. The belts 62 may be continuously driven during the repeated stacking operations, the shoe surfaces 78 being restored to their horizontal work supporting positions each time light is again incident on the cell 86 by reason of the descent of the piece P being stacked. If the pieces P to be stacked or repositioned are of low mass and tend to be flimsy, thereby rendering control of their motion during descent more difficult, it is advantageous to employ a pair of work depressors 100, 100 (FIGS. 6–8). These depressors also function to restrain the pieces P against lateral displacement as they are wiped outwardly and downwardly by the surfaces 82. Each depressor 100 is a piston rod having a lower pointed extremity and reciprocable in a cylinder 102. The cylinders 102 are respectively secured to the inner ends of brackets 104 the outer ends of which are secured on the frame sides 50, 52 respectively. The arrangement is such that, in response to the work interception of the beam to the cell 86, a valve (not shown) admits air to the cylinders 102 simultaneously to cause the depressors 100 to urge central portions of the piece P being stacked to be moved vertically downward against return springs (not shown), the action being progressively indicated in FIGS. 6–8 inclusive.

From the foregoing it will be appreciated that each of the illustrative machines is of simple and inexpensive construction and capable of transferring successive workpieces from one position to another.

Having thus described my invention, what I claim as new and desire to secure by Letters Patent of the United States is:

1. A machine for feeding and stacking workpieces in a uniform manner comprising, a conveyor having a pair of endless, spaced work engaging belts, means disposed adjacent said belts yieldingly to hold a respective workpiece in tractional relation with said belts, a work rest arranged beneath said belts, means automatically responsive to arrival of the piece into predetermined relation to the operating path of the conveyor to free the piece from said holding means and to force the piece downwardly onto said work rest, means for maintaining said work rest in a position whereby the belt when in a deflected position will contact the top article of the stack on the work seat.

2. A machine for feeding, inverting, and stacking sheet-like workpieces in uniform manner comprising an endless conveyor having an upper and a lower reach, a frame for rotatably supporting a pair of spaced pulleys over which the conveyor travels, at least one of the pulleys being yieldingly urged away from the other normally to maintain the lower reach rectilinear, a suction means cooperative with the lower reach when rectilinear to support a workpiece thereagainst, guide means cooperative with the upper and lower conveyor reaches to insure that a piece fed on the upper reach will be progressively inverted and advanced to said suction means, a work rest arranged beneath the lower reach, and means automatically responsive to arrival of the piece at a predetermined point along the lower reach for deflecting the latter from its rectilinear position whereby the influence of said suction means is disrupted and the piece deposited on said work rest.

3. A machine as set forth in claim 2 wherein the reach deflecting means comprises a pair of members engageable with the lower reach at longitudinally spaced points and yieldingly displaceable in unison, and solenoid means for actuating said members.

4. A machine as set forth in claim 2 wherein the guide means comprises a yieldingly suspended, partly arcuate and partly straight plate, its arcuate portion having frictional engagement with the conveyor in the vicinity of one of the pulleys and the straight portion extending to an end of said suction means.

5. A machine for stacking workpieces of sheet material in uniform manner comprising a conveyor having a pair of endless, spaced work-engaging belts, means for guiding each workpiece with its opposed side margins contacting said belts, a pair of movable supports disposed yieldingly to hold the respective workpiece side margins in tractional relation with said belts, a rest for the workpieces to be stacked beneath said supports, means automatically operable in response to arrival of the workpiece into predetermined relation to the operating path of the conveyor to free the piece from said supports and force the piece downwardly onto said rest, means for maintaining said work rest in a position whereby the belt when in a deflected position will contact the top article of the stack on the work rest.

6. A machine for stacking workpieces of sheet material in uniform manner comprising a conveyor having a pair of endless, spaced work-engaging belts, means for guiding each workpiece with its opposed side margins contacting said belts, a pair of work supports mounted for pivotal movement into and out of work supporting relation and disposed yieldingly to hold the respective workpiece side margins in tractional relation with said belts, a rest for the workpieces to be stacked beneath said supports, and means automatically operable in response to arrival of the workpiece into predetermined relation to the operating path of the conveyor to free the piece from said supports on said rests, said work freeing means comprising a work detecting cell, and electrically actuated means operable by the cell for pivoting said supports.

7. A machine for stacking workpieces of sheet material in uniform manner comprising a conveyor having a pair of work-engaging belts, means for guiding each workpiece with its opposed side margins contacting said belts, a pair of movable supports disposed yieldingly to hold the respective workpiece side margins in tractional relation with said belts, at least one of said supports formed to provide a work supporting shoe surface and a work wiping surface engageable transversely of the workpiece when freed from said shoe surface, a rest for the workpieces to be stacked beneath said supports, and means automatically operable in response to arrival of the workpiece into predetermined relation to the operating path of the conveyor to free the piece from said supports on said rest.

8. A machine for stacking workpieces of sheet material in uniform manner comprising a conveyor having a pair of endless, spaced work-engaging belts, means for guiding each workpiece with its opposed side margins contacting said belts, a pair of movable supports disposed yieldingly to hold the respective workpiece side margins in tractional relation with said belts, a rest for the workpieces to be stacked beneath said supports, means automatically operable in response to arrival of the workpiece into predetermined relation to the operating path of the conveyor to free the piece from said supports on said rest, and a vertically movable work-engaging depresser automatically yieldingly operable in response to the arrival of the workpiece in its position to be freed to urge the piece onto the stack.

9. A machine for stacking workpieces of sheet material in uniform manner comprising a frame having a pair of endless, spaced work-engaging belts, means for guiding each workpiece with its opposed side margins contacting said belts, a pair of movable supports carried by opposite sides of said machine frame, said supports disposed yieldingly to hold the respective workpiece side margins in tractional relation with said belts and said frame sides having adjustable interconnecting means for enabling different widths of workpieces to be accommodated on said supports, a rest for the workpieces to be stacked beneath said supports, and means automatically operable in response to arrival of the workpiece into predetermined relation to the operating path of the conveyor to free the piece from said supports on said rest.

References Cited

UNITED STATES PATENTS

| | | | |
|---|---|---|---|
| 3,132,858 | 5/1964 | Bernard | 271—68 |
| 3,305,233 | 2/1967 | Cody | 271—74 |

RICHARD E. AEGERTER, *Primary Examiner.*